June 16, 1953 A. J. BOHN 2,642,308
WATER REMOVING DEVICE FOR VEHICLE VENTILATING WINDOWS
Filed Jan. 26, 1952
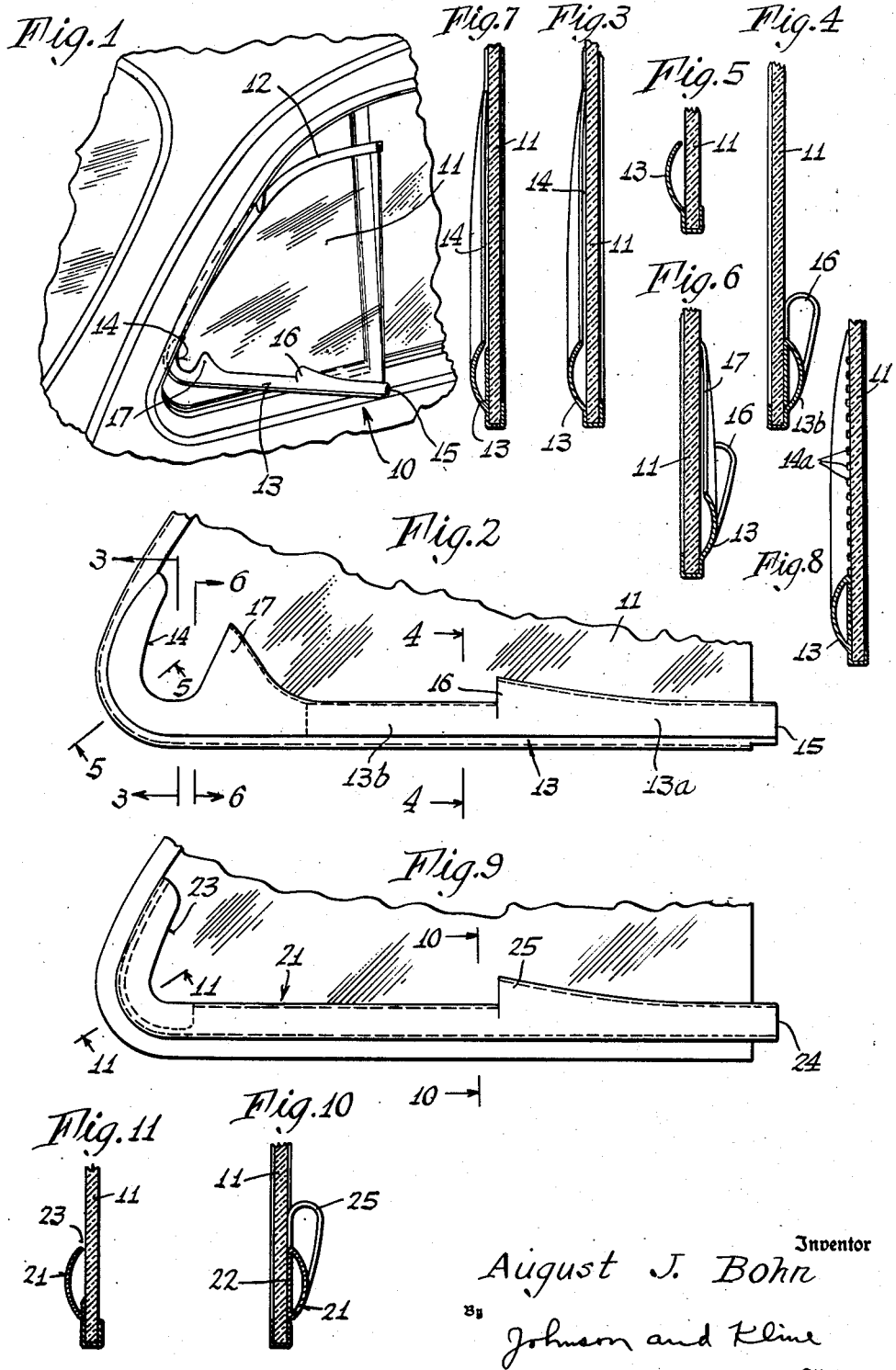
Inventor
August J. Bohn
By Johnson and Kline
Attorneys Patented June 16, 1953

2,642,308

UNITED STATES PATENT OFFICE 2,642,308

WATER REMOVING DEVICE FOR VEHICLE VENTILATING WINDOWS

August J. Bohn, Atlanta, Ga.

Application January 26, 1952, Serial No. 268,364

13 Claims. (Cl. 296—44)

The present invention relates to water removing means for windows, and more particularly for vertically pivoted ventilator windows of the type used in motor vehicles, for the purpose of preventing rain from draining into the interior of the motor vehicle when the window is opened to ventilating position.

Efforts have been made to prevent rain from dripping from the pivoted ventilator window to the inside of the vehicle. These have taken the form of troughs or gutters for leading the water away from the inwardly projecting portion of the ventilator but such efforts have been ineffectual since no means for positively withdrawing the water and moving it to the outside have been applied on the devices.

The present invention overcomes these difficulties by providing a rain removing means which has as a part thereof means for positively withdrawing the water from the window and conducting it to the outside of the vehicle. This is accomplished by providing a nozzle at the forward end of the device which opens toward the windowpane and by providing a discharge opening at the other end of the device which projects outwardly from the vehicle and by connecting thereto, intermediate the ends thereof, a suction producing means for positively withdrawing the water through the nozzle and delivering it to the opening in the discharge end.

In the preferred form of the invention the suction producing means comprises a large forwardly facing air scoop connected to the device in such a manner that air passing into the scoop through the device to the discharge end will, by an aspiration effect, draw the water from the windowpane and carry it to the discharge end. By thus positively removing the water, all danger of the water dripping into the vehicle is eliminated.

The nozzle at the forward end may be made of the desired shape and to extend over the desired distance to accomplish the complete removal of the water for any particular style of window.

Furthermore, the device of the present invention may be made as a part of the frame for the windowpane or may be made as a separate attachment to be secured to the glass and can be made of metal, plastic or other suitable material as required.

Other features and advantages of the invention will be apparent from the specification and claims when considered in connection with the drawings in which:

Figure 1 is a perspective view of the corner of an automobile showing a ventilator window having the present invention installed thereon.

Fig. 2 is a detailed side view of the lower part of the window showing the rain-removing device thereon.

Fig. 3 is a sectional view taken along line 3—3 of Fig. 2.

Fig. 4 is a sectional view taken along line 4—4 of Fig. 2.

Fig. 5 is a sectional view taken along line 5—5 of Fig. 2.

Fig. 6 is a sectional view taken along line 6—6 of Fig. 2.

Fig. 7 is a view similar to Fig. 3 showing a modified form of the invention.

Fig. 8 is a view similar to Fig. 3 showing a modified form of nozzle.

Fig. 9 is a view similar to Fig. 2, showing the water-removing device applied as an attachment.

Fig. 10 is a sectional view taken along line 10—10 of Fig. 9.

Fig. 11 is a sectional view taken along line 11—11 of Fig. 9.

For the purpose of illustrating the present invention it is shown applied to the vertically pivoted ventilator window 10 of an automobile or the like vehicle. Such windows usually have a windowpane 11, mounted in a U-shaped metal edge embracing frame 12 which extends at least around the top, front and bottom edges thereof and pivot in such a manner that the front end moves into the automobile while the rear end projects outwardly.

In Figs. 1 to 6, the water-removing attachment is illustrated as being formed as a part of the ventilator window frame and comprises a tubular member 13 connected to the free edge of the outer leg of the U-shaped frame member to extend along the bottom frame member to the forward end thereof and up along the front end to the desired height. Because of its location adjacent the frame, it will not interfere with the vision of the driver or occupants of the automobile. The tubular member, at the forward end thereof, is provided with an apertured portion having a relatively long narrow aperture 14 extending along the inner edge and facing and opening on the windowpane to form a water receiving nozzle. The term "nozzle" as used herein shall refer to the apertured part of the tubular member which extends along the forward portion of the window. At the rear end of the tubular member there is a discharge opening 15, the tubular member forming a passage from the nozzle to the discharge opening.

According to the present invention means are provided on the device for positively drawing the water on the windowpane in through the nozzle and carrying it to the discharge opening. In the herein illustrated form of the invention, this is accomplished by providing the tubular member intermediate the ends thereof with a forwardly facing air scoop 16 which is preferably positioned rearwardly of the pivotal mounting for the window to insure it being in position to receive a flow of air. This scoop is connected with the tubular member and projects therefrom so that air is collected thereby and passes therethrough and through the rear part 13a of the tubular member to the discharge opening. This passage of air across the end of the portion 13b of the tubular member will result in an aspirating effect which will produce a suction in the nozzle to positively draw the water from the windowpane and move it through the member to the discharge opening. By thus positively drawing the water into the nozzle and discharging it from the discharge opening 15 accumulation of water on the windowpane is prevented and dripping of the water on the inside of the automobile is avoided. The nozzle portion may extend as far back along the tubular member as is necessary to insure the removal of the water.

If necessary a supplemental nozzle may be provided to remove the water where a large windowpane is employed. In the form of the invention shown in Fig. 1, the tubular member is provided with a rear nozzle member 17 which opens forwardly so that, with the upturned end portion, a U-shaped nozzle is provided.

While in the form of the invention shown in Figs. 1 to 6, the tubular member is formed as extension of the outside leg of the U of the U-shaped frame 12, it is to be understood that if the seal produced by this frame member is not sufficient to prevent air leakage which might destroy the vacuum in the nozzle, the tubular member may be formed as shown in Fig. 7 to overlie the outside of the outer leg of the U-shaped frame member and cooperate with the said outer leg to form a completely airproof tubular member. Also the nozzle instead of being formed by a continuous aperture may be formed by a series of apertures 14a shown in Fig. 8.

Under some circumstances it may be desired to make the device as an attachment which can be applied to existing windows. Such a device which may be made of metal, plastic or other suitable material is shown in Fig. 9 and comprises a tubular member 21 having a flat bottom surface 22 which is adapted to fit against the windowpane and be secured thereto. While this may be accomplished with clips and other suitable fastening devices, in the herein illustrated form of the invention it is secured to the windowpane as shown in Fig. 9 by means of a suitable adhesive. It will be noted that the device is otherwise similar to the device of Figs. 1 and 2 in that it includes an apertured nozzle portion 23 at the forward end, a discharge opening 24 at the rear end and an air scoop 25 intermediate the ends for producing a suction in the nozzle through an aspiration effect to positively withdraw water from the windowpane.

The extent of the nozzle rearwardly along the windowpane may be dictated by the particular ventilator window for which it is intended to be installed. In some instances it may be desired to provide a plurality of apertures such as shown at 14a along the part of the tubular member extending forwardly of the pivot to pick up any water which may run forwardly along the windowpane due to the angle of the window when in ventilating position.

It will be seen, therefore, that the present invention provides a water removing device which can be made as an integral part of the original installation or as an attachment to be applied to a ventilator window and which positively removes the water from the ventilator window and prevents water from dripping inside of the automobile or the like.

Variations and modifications may be made within the scope of the claims and portions of the improvements may be used without others.

I claim:

1. A water removing device for a window having a windowpane comprising a tubular member having a nozzle provided with a relatively narrow aperture means directed toward said windowpane and a discharge opening and having means intermediate the ends thereof to apply suction to the nozzle to draw water therein through said narrow aperture means and deliver the water to the discharge opening; and means securing the tubular member to the window.

2. A water removing device for a window having a window pane comprising a tubular member secured to the window and having a nozzle at the forward end and opening inwardly toward said windowpane and a discharge opening at the rear end and having a forwardly facing air scoop connected thereto intermediate the ends, air passing from the air scoop through the tubular member to the discharge opening producing an aspiration effect to positively draw water into the nozzle from the windowpane and deliver the water to the discharge opening.

3. A water removing device for a pivoted ventilator window having a windowpane comprising a tubular member secured to the window and having an apertured inner edge forming a nozzle extending along the forward portion of the window with the apertured inner edge opening inwardly toward said windowpane and a discharge opening at the rear end and having suction producing means thereon intermediate the ends to apply suction to the nozzle to draw water therein and deliver the water to the discharge opening.

4. A ventilator window adapted to pivot about a substantially vertical axis and having a windowpane; and water removing means comprising a tubular member secured to the window to extend transversely of the pivotal axis and having a portion extending forwardly of the axis and provided with an elongate narrow aperture opening inwardly toward said windowpane to form a nozzle and a discharge opening at the rear end and having suction producing means thereon intermediate the ends to apply suction to the nozzle by an aspiration effect to positively draw water therein and deliver the water to the discharge opening.

5. A ventilator window adapted to pivot about a substantially vertical axis and having a windowpane; and water removing means comprising a tubular member secured to the window to extend transversely of the pivotal axis and having a nozzle forwardly of the axis and opening inwardly toward said windowpane and a discharge opening at the rear end and having a forwardly extending air scoop connected thereto rearwardly of said axis to produce a suction in the nozzle by an aspiration effect to positively draw water therein and deliver the water to the discharge opening.

6. A ventilator window adapted to pivot about a substantially vertical axis and having a windowpane; and water removing means comprising a tubular member secured to the window to extend transversely of the pivotal axis and having a portion extending along the forward part of the window and provided with a plurality of spaced apertures forwardly of the axis to form a nozzle and opening inwardly toward said windowpane and a discharge opening at the rear end and having suction producing means thereon intermediate the ends to apply suction to the nozzle by an aspiration effect to positively draw water therein and deliver the water to the discharge opening.

7. A water removing device for a window having a windowpane comprising a frame for said windowpane including a tubular member having a portion at the forward end provided with a relatively narrow aperture opening toward the windowpane and a discharge opening at the rear end and having suction producing means to apply suction to the nozzle to draw water therein and deliver the water to the discharge opening.

8. A pivoted ventilator window having a windowpane, a U-shaped frame extending around at least the front and bottom of said windowpane and gripping the edge thereof, a tubular member on the outer member of the U and extending along the bottom and front edge of the windowpane, said tubular member having an apertured inner edge closely adjacent the window at the forward end thereof forming an elongate nozzle directed toward the windowpane and a discharge opening at the rear end and having suction producing means intermediate the ends to apply suction to the nozzle to draw water therein and deliver the water to the discharge opening.

9. A ventilator window having a windowpane, a U-shaped frame extending around and gripping at least the front and bottom edges of said windowpane, a tubular member overlying the outer member of the U and extending along the bottom and front edge of the windowpane, said tubular member having an apertured inner edge at the forward end thereof forming a nozzle directed toward the windowpane and a discharge opening at the rear end and a forwardly facing air scoop connected to the tubular member intermediate the ends thereof for producing a suction in the nozzle to draw water therein and deliver the water to the discharge opening by means of the air flowing in the tubular member from the air scoop through the discharge opening.

10. A water removing attachment for a window having a windowpane comprising a tubular member having an elongate nozzle provided with a relatively narrow opening portion directed inwardly at the forward end to face the windowpane and a discharge opening at the rear end and having suction producing means to apply suction to the nozzle to positively draw water therein and deliver the water to the discharge opening; and means for mounting the tubular member on the window.

11. A water removing attachment for a window having a windowpane comprising a tubular member having an elongate nozzle provided with a relatively narrow opening portion directed inwardly at the forward end to face the windowpane and a discharge opening at the rear end and having suction producing means to apply suction to the nozzle to positively draw water therein and deliver the water to the discharge opening and having a flat glass engaging back portion for mounting the tubular member on the window.

12. A water removing attachment for a window having a windowpane comprising a tubular member having a nozzle opening at the forward end toward the windowpane and a discharge opening at the rear end and a forwardly facing air scoop connected to the member intermediate the ends thereof to produce a suction in the nozzle to draw water therein and deliver the water to the discharge opening by means of air flowing in said member from the air scoop through the discharge opening; and means for securing the tubular member to the window to extend along the same.

13. A water removing attachment for a window having a windowpane comprising a tubular member having an upturned forward end provided with an apertured inner edge to form a nozzle opening inwardly toward said windowpane, said tubular member having a discharge opening at the rear end and having a forwardly facing air scoop connected thereto intermediate the ends to produce a suction in the nozzle to positively draw water therein from the windowpane through said apertured edge and to deliver the water to the discharge opening; and means for securing the attachment to the window.

AUGUST J. BOHN.

References Cited in the file of this patent

UNITED STATES PATENTS

| Number | Name | Date |
|---|---|---|
| 2,354,443 | Schirra | July 25, 1944 |
| 2,451,399 | Martin | Oct. 12, 1948 |
| 2,547,911 | Heyck | Apr. 3, 1951 |